US008234894B2

(12) United States Patent
Taniguchi et al.

(10) Patent No.: US 8,234,894 B2
(45) Date of Patent: Aug. 7, 2012

(54) ELECTRIC STEERING LOCK DEVICE

(75) Inventors: Takeshi Taniguchi, Miyazaki (JP); Takushi Matsuto, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 12 days.

(21) Appl. No.: 12/083,277

(22) PCT Filed: Sep. 21, 2006

(86) PCT No.: PCT/JP2006/318694
§ 371 (c)(1),
(2), (4) Date: Aug. 27, 2009

(87) PCT Pub. No.: WO2007/055069
PCT Pub. Date: May 18, 2007

(65) Prior Publication Data
US 2009/0320536 A1 Dec. 31, 2009

(30) Foreign Application Priority Data
Nov. 11, 2005 (JP) .................................. 2005-327182

(51) Int. Cl.
*B60R 25/02* (2006.01)

(52) U.S. Cl. ............. 70/186; 70/278.7; 70/252; 74/527; 74/528; 180/287; 280/771

(58) Field of Classification Search ............ 70/182–186, 70/252, 278.7; 74/527, 528; 180/78, 287; 280/771, 779
See application file for complete search history.

(56) References Cited

U.S. PATENT DOCUMENTS

| 1,453,256 | A | * | 4/1923 | Ganz | 70/216 |
| 1,657,402 | A | * | 1/1928 | Kenworthy et al. | 70/252 |
| 2,580,894 | A | * | 1/1952 | De Hoffmann | 70/216 |
| 2,890,581 | A | * | 6/1959 | Lewis | 70/248 |
| 4,643,009 | A | * | 2/1987 | Sato | 70/252 |
| 5,016,454 | A | * | 5/1991 | Al-Sheikh | 70/185 |
| 5,136,284 | A | * | 8/1992 | Kitamura | 340/5.22 |
| 5,735,151 | A | * | 4/1998 | Nickeas et al. | 70/221 |
| 6,000,609 | A | * | 12/1999 | Gokcebay et al. | 235/382 |
| 6,234,039 | B1 | * | 5/2001 | Garnault et al. | 74/492 |
| 6,564,601 | B2 | * | 5/2003 | Hyatt, Jr. | 70/278.3 |
| 6,615,625 | B2 | * | 9/2003 | Davis | 70/278.3 |

FOREIGN PATENT DOCUMENTS

| CN | 1533940 A | 10/2004 |
| EP | 0 499 001 A1 | 8/1992 |
| EP | 1 157 907 A2 | 11/2001 |
| FR | 2 799 709 A1 | 4/2001 |
| FR | 2 860 469 A1 | 4/2005 |
| JP | 63-19454 | 2/1988 |
| JP | 02-088346 | 3/1990 |
| JP | 08-198057 | 8/1996 |
| JP | 2001-163187 | 6/2001 |
| JP | 2002-295090 | 10/2002 |

* cited by examiner

*Primary Examiner* — Lloyd Gall
(74) *Attorney, Agent, or Firm* — Carrier Blackman & Associates, P.C.; Joseph P. Carrier; William D. Blackman

(57) ABSTRACT

An electric steering lock device is provided that includes a column pipe, a steering shaft pivotably passed through the interior of the column pipe, and an electric lock unit that has an electric motor and that can switch in response to operation of the electric motor between a locked state, in which pivoting of the steering shaft is prevented, and an unlocked state in which pivoting of the steering shaft is permitted, wherein the electric lock unit is disposed within the column pipe. This arrangement can advantageously make breakage or unauthorized unlocking of the electric lock unit difficult.

9 Claims, 5 Drawing Sheets

ELECTRIC STEERING LOCK DEVICE

TECHNICAL FIELD

The present invention relates to an electric steering lock device that includes a column pipe, a steering shaft pivotably passed through the interior of the column pipe, and electric lock means that has an electric motor and that can switch in response to operation of the electric motor between a locked state in which pivoting of the steering shaft is prevented and an unlocked state in which pivoting of the steering shaft is permitted.

BACKGROUND ART

Such an electric steering lock device is suitably used in a smart entry system that can be switched between being locked and unlocked without a key, and as disclosed in, for example, Patent Publication 1, the electric lock means is generally disposed outside the column pipe.
Patent Publication 1: Japanese Patent Application Laid-open No. 2002-295090

DISCLOSURE OF INVENTION

Problems to be Solved by the Invention

However, in the arrangement disclosed in Patent Publication 1 above, in which the electric lock means is disposed outside the column pipe, since the electric lock means is exposed when a column cover is detached, breakage or unauthorized unlocking is possible using an unauthorized tool, and the electric lock means itself conventionally has a structure that can withstand breakage. Because of this, the structure is complicated and has large dimensions, thus resulting in high cost.

The present invention has been accomplished in the light of such circumstances, and it is an object thereof to provide an electric steering lock device that makes breakage or unauthorized unlocking of electric lock means difficult by unauthorized means.

Means for Solving the Problems

In order to attain the above object, according to a first aspect of the present invention, there is provided an electric steering lock device comprising a column pipe, a steering shaft pivotably passed through the interior of the column pipe, and electric lock means that has an electric motor and that can switch in response to operation of the electric motor between a locked state in which pivoting of the steering shaft is prevented and an unlocked state in which pivoting of the steering shaft is permitted, characterized in that the electric lock means is disposed within the column pipe.

According to a second aspect of the present invention, in addition to the first aspect, the electric lock means is incorporated into the steering shaft within the column pipe.

Effects of the Invention

In accordance with the first aspect of the present invention, since the electric lock means is disposed within the column pipe, it is unnecessary for the electric lock means to have a structure that can withstand breakage, becomes impossible to break or unlock the electric lock means, and theft resistance can be enhanced.

Furthermore, in accordance with the second aspect of the present invention, since it is incorporated into the steering shaft, theft resistance can be further enhanced.

EXPLANATION OF REFERENCE NUMERALS AND SYMBOLS

13 Column pipe
14 Steering shaft
15 Electric lock means
34 Electric motor

BEST MODE FOR CARRYING OUT THE INVENTION

A mode for carrying out the present invention is explained below by reference to one embodiment of the present invention shown in the attached drawings.

Embodiment 1

FIG. 1 to FIG. 6 show one embodiment of the present invention.

Figure 1:
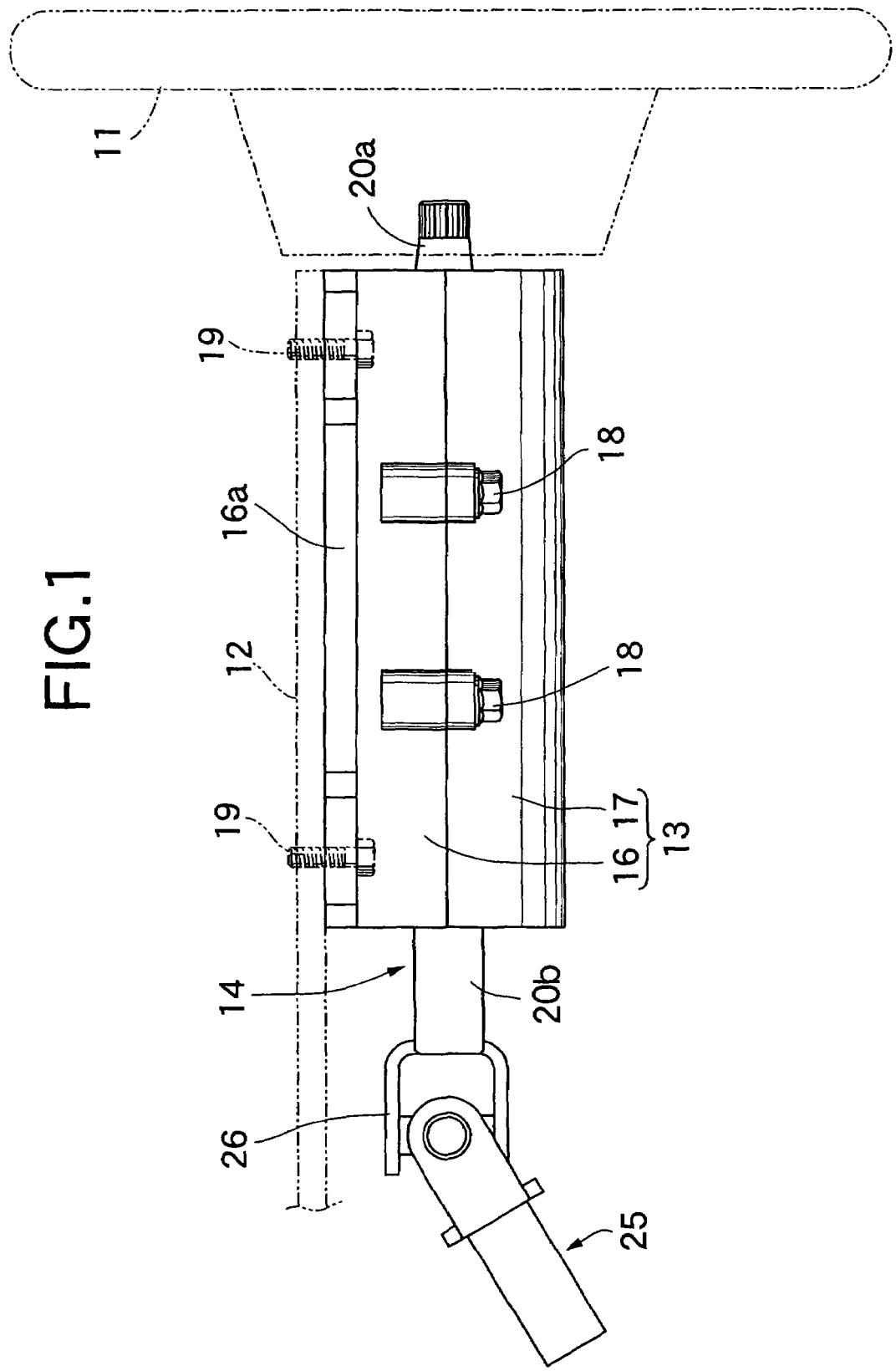
FIG. 1 is a side view of an electric steering lock device (first embodiment).
Figure 2:
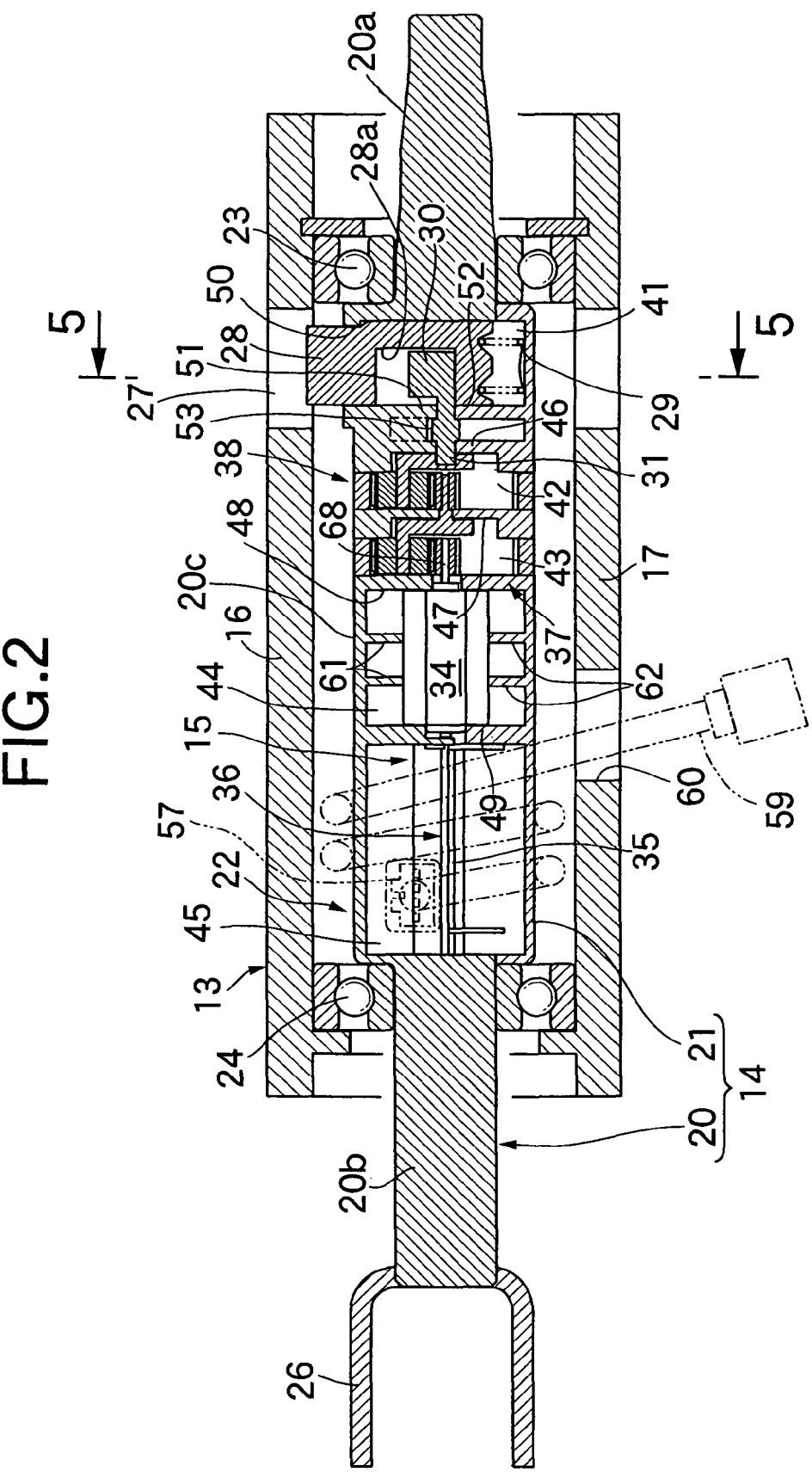
FIG. 2 is a longitudinal sectional view of the electric steering lock device (first embodiment).

First, in FIG. 1 and FIG. 2, a steering wheel 11 for steering a vehicle is mounted on one end of a steering shaft 14 pivotably passed through the interior of a column pipe 13 fixed to a support member 12 on a vehicle body side, and electric lock means 15 is disposed within the column pipe 13, the electric lock means 15 enabling switching between a locked state in which it engages with the column pipe 13 so as to prevent pivoting of the steering shaft 14 and an unlocked state in which it disengages from the column pipe 13 so as to permit pivoting of the steering shaft 14.

The column pipe 13 is formed by joining to each other a pair of halved tubes 16 and 17 having a semicircular cross-section by, for example, a plurality of bolts 18, and a mounting flange 16a provided integrally on one halved tube 16 of the two halved tubes 16 and 17 is secured to the support member 12 by, for example, a plurality of bolts 19.

Figure 3:
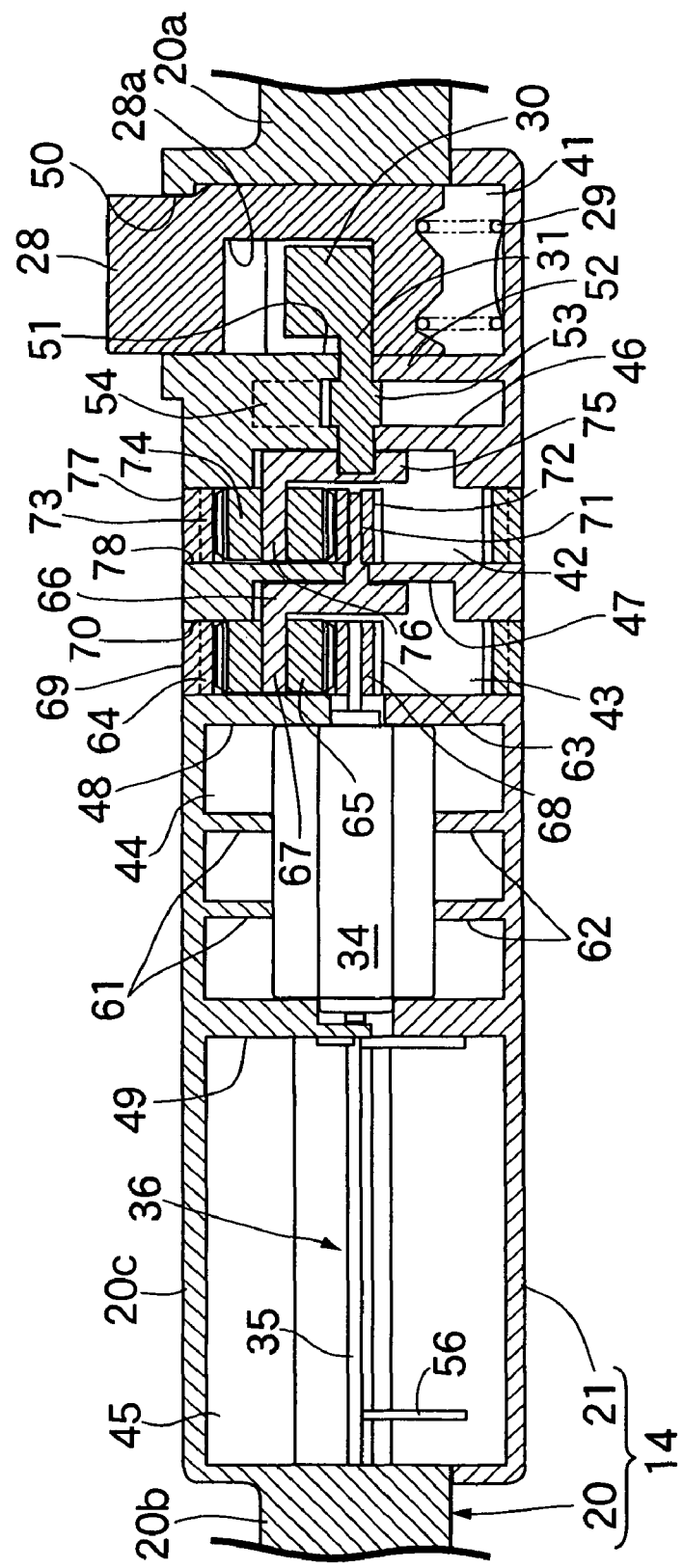
FIG. 3 is a longitudinal sectional view of an essential part of a steering shaft (first embodiment).
Figure 4:
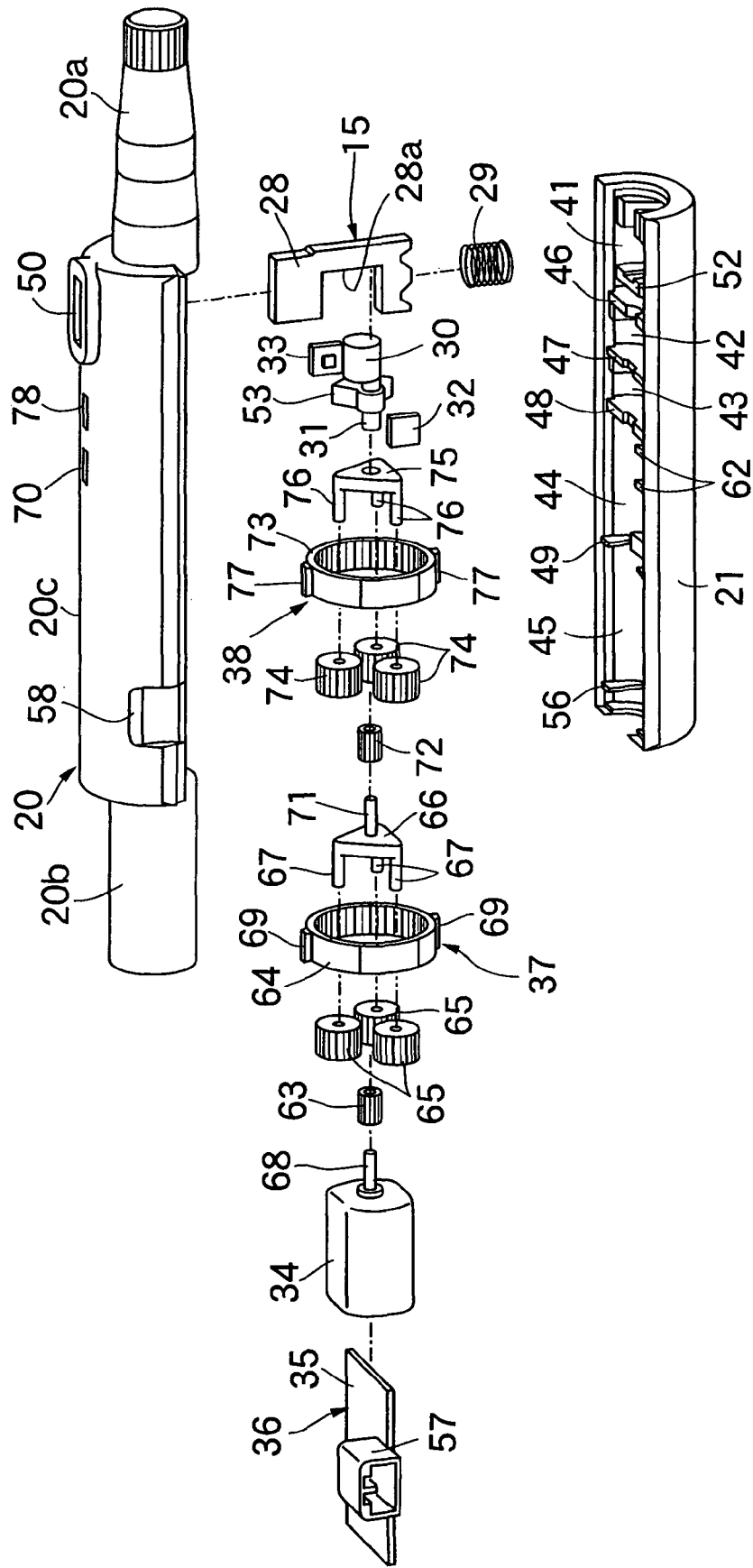
FIG. 4 is an exploded perspective view of the steering shaft and electric lock means (first embodiment).

Referring to FIG. 3 and FIG. 4 together, in, for example a smart entry system, the electric lock means 15 disposed within the column pipe 13 releases the locked state in response to a vehicle user with a portable transceiver getting in the vehicle in order to enable pivoting of the steering shaft 14, and operates to attain the locked state in response to the vehicle user with the portable transceiver getting out of the vehicle in order to prevent pivoting of the steering shaft 14, and the electric lock means 15 is incorporated into the steering shaft 14, which is formed by fixing a cover member 21 to a shaft main body 20 by, for example, welding, etc.

The shaft main body 20 is formed by integrally joining a pair of shaft portions 20a and 20b disposed coaxially with a gap therebetween via a semicylindrical portion 20c having a semicircular cross-section. The cover member 21, which has a semicircular cross-section, is fixed to the shaft main body 20 so as to cover an open end of the semicylindrical portion 20c, and the semicylindrical portion 20c and the cover member 21 form, in a mutually joined state, a cylindrical housing part 22, which is coaxial with the two shaft portions 20a and 20b. That is, the steering shaft 14 has the pair of shaft portions 20a and 20b and the cylindrical housing part 22 providing a coaxial connection between these shaft portions 20a and 20b, and is passed coaxially through the interior of the column pipe 13 so as to make extremities of the two shaft portions 20a and 20b project from opposite ends of the column pipe 13, and end parts of the two shaft portions 20a and 20b close to the housing part 22 are pivotably supported on the column pipe 13 via, for example, ball bearings 23 and 24. Furthermore, the steering wheel 11 is fixed to a forward end part of one shaft portion 20a of the two shaft portions 20a and 20b, and a substantially U-shaped connecting part 26 is provided at the extremity of the other shaft portion 20b, the connecting part 26 forming part of a universal joint 25.

The electric lock means 15 includes a lock plate 28 that can move in a direction along one diameter of the steering shaft 14 so as to detachably engage with an engagement hole 27 provided in the halved tube 16 of the column pipe 13 along the radial direction of the steering shaft 14, a return spring 29 that urges the lock plate 28 in a direction in which it engages with the engagement hole 27, a drive shaft 31 having an eccentric cam 30 that abuts against the lock plate 28 from the side opposite to the spring load direction of the return spring 29, an unlock switch 32 and a lock switch 33 for detecting according to a pivot position of the drive shaft 31 a position at which the lock plate 28 is detached from the engagement hole 27 and a position at which the lock plate 28 is engaged with the engagement hole 27, an electric motor 34 that has an axis of rotation coaxial with the drive shaft 31 and that can rotate forward and backward, a control unit 36 provided on a board 35 so as to control operation of the electric motor 34, a first reduction mechanism 37 for slowing down the output of the electric motor 34, and a second reduction mechanism 38 for further slowing down the output of the first reduction mechanism 37 and transmitting it to the drive shaft 31, the electric lock means 15 being built in the housing part 22 of the steering shaft 14.

First to fifth housing chambers 41, 42, 43, 44, and 45 are formed within the housing part 22 from the shaft portion 20a side, to which the steering wheel 11 is fixed; a first dividing wall 46 between the first and second housing chambers 41 and 42, a second dividing wall 47 between the second and third housing chambers 42 and 43, a third dividing wall 48 between the third and fourth housing chambers 43 and 44, and a fourth dividing wall 49 between the fourth and fifth housing chambers 44 and 45 are formed by cooperation of the semicylindrical portion 20c with the cover member 21.

The majority of the lock plate 28, which is formed as a flat plate along a plane perpendicular to the axis of the steering shaft 14, is housed within the first housing chamber 41, and one end part of the lock plate 28 is slidably inserted into an insertion hole 50 provided in the semicylindrical portion 20c so as to face the engagement hole 27. Furthermore, a portion, on one side, of the lock plate 28 in the first housing chamber 41 is guided by an end wall of the housing part 22 on the shaft portion 20a side, and a portion, on the other side, of the lock plate 28 in the first housing chamber 41 is guided by guide walls 51 and 52 provided respectively on the semicylindrical portion 20c and the cover member 21 and disposed within the first housing chamber 41. Furthermore, the return spring 29 is provided in a compressed state between the cover member 21 and the other end of the lock plate 28 and is housed within the first housing chamber 41.

The drive shaft 31, which is coaxial with the housing part 22, runs through between the pair of guide walls 51 and 52 and through the first dividing wall 46, and is pivotably supported by the two guide walls 51 and 52 and the first dividing wall 46.

Figure 5:
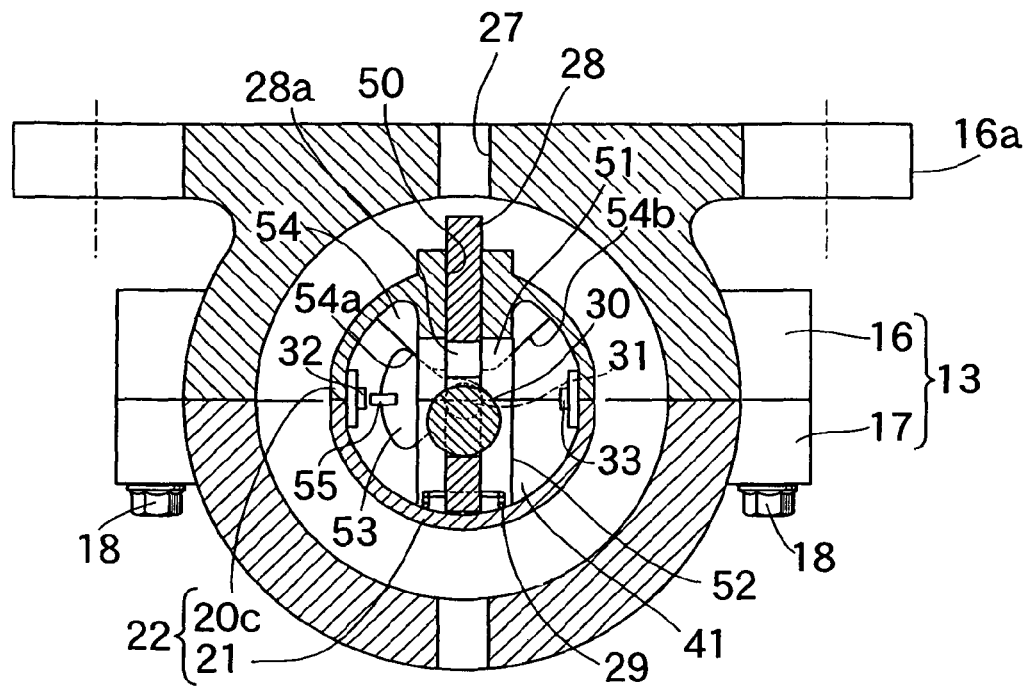
FIG. 5 is a sectional view along line 5-5 in FIG. 2 in an unlocked state (first embodiment).

Referring in addition to FIG. 5, a recess 28a opening on the two guide walls 51 and 52 side is provided in a middle section of the lock plate 28, and the eccentric cam 30, which is provided at one end of the drive shaft 31, is inserted into the interior of the recess 28a. The lock plate 28, which is spring-biased by the return spring 29, thus abuts against the eccentric cam 30 disposed within the recess 28a, and the position of the lock plate 28 is determined according to the pivot position of the eccentric cam 30.

Figure 6:
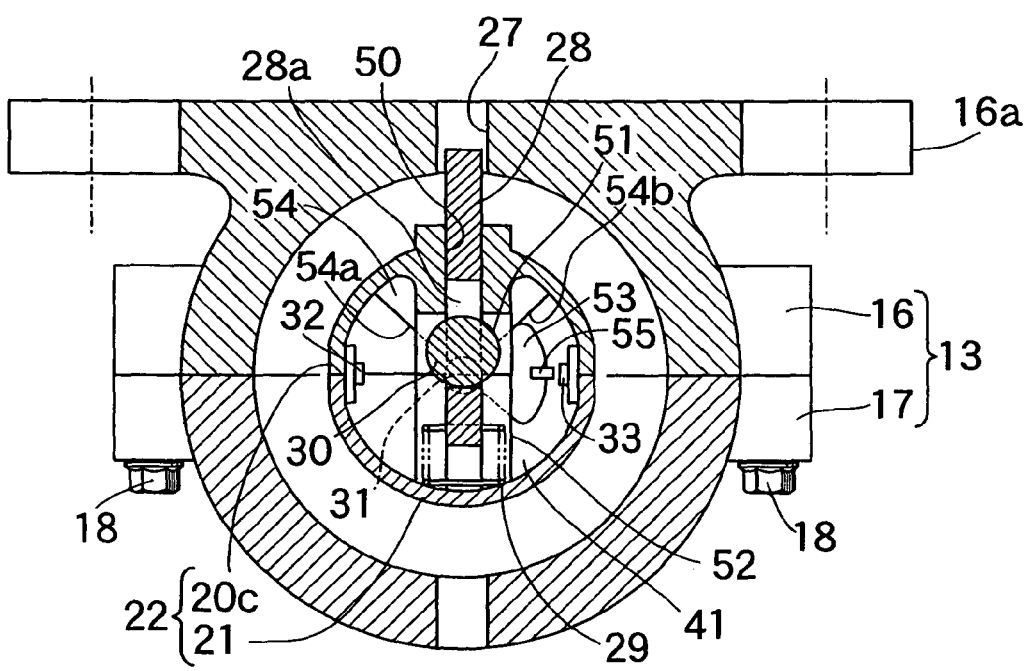
FIG. 6 is a sectional view, corresponding to FIG. 5, in a locked state (first embodiment).

The drive shaft 31 is provided integrally with a fan-shaped restricting projection 53 between the two guide walls 51 and 52 and the first dividing wall 46, and the semicylindrical portion 20c is provided with an angled stopper 54 having, on opposite sides, an unlock position restricting face 54a that abuts against the restricting projection 53 at an unlock position in which as shown in FIG. 5 the lock plate 28 is detached from the engagement hole 27 and a lock position restricting face 54b that abuts against the restricting projection 53 at a lock position in which as shown in FIG. 6 the lock plate 28 is engaged with the engagement hole 27.

Moreover, a magnet 55 is fixed to a middle section along the peripheral direction of the outer periphery of the restricting projection 53. The unlock switch 32 and the lock switch 33 are formed by mounting a Hall IC on a board; the unlock switch 32 is disposed on an inner face of the housing part 22 so as to detect the magnet 55 when as shown in FIG. 5 the restricting projection 53 abuts against the unlock position restricting face 54a of the stopper 54, and the lock switch 33 is disposed on an inner face of the housing part 22 so as to detect the magnet 55 when as shown in FIG. 6 the restricting projection 53 abuts against the lock position restricting face 54b of the stopper 54.

The control unit 36 provided on the board 35 is housed within the fifth housing chamber 45. Moreover, the cover member 21 is provided with a rib 56 supporting the board 35, and an opening 58 is provided in the semicylindrical portion 20c, a coupler 57 provided on the board 35 facing the opening 58. A harness 59 connected to the coupler 57 is wound around the housing part 22 of the steering shaft 14 within the column pipe 13 so that it is wound or loosened in response to pivoting of the steering shaft 14, and is led out via a lead out hole 60 provided in the halved tube 17 of the column pipe 13.

The electric motor 34 is coaxial with the housing part 22 and housed within the fourth housing chamber, and pluralities of ribs 61 and 62 sandwiching the electric motor 34 from opposite sides are provided respectively on the semicylindrical portion 20c and the cover member 21.

The first reduction mechanism 37 is a planetary gear mechanism having a first sun gear 63 fixed to an output shaft of the electric motor 34, a first ring gear 64 fixed to the housing part 22 so as to coaxially surround the first sun gear 63, first planetary gears 65 meshing with the first sun gear 63 and the first ring gear 64 at three positions spaced in the peripheral direction, and a first carrier 66 that has support shafts 67 rotatably supporting these first planetary gears 65 and that retains the first planetary gears 65, the first reduction mechanism 37 being housed in the third housing chamber 43.

An output shaft 68 of the electric motor 34 runs rotatably through the third dividing wall 48 and projects into the third housing chamber 43, and the first sun gear 63 is fixed to a portion of the output shaft 68 that projects into the third housing chamber 43. Furthermore, the first ring gear 64 basically has an outer diameter that fits into the inner periphery of the housing part 22, and rotation of the first ring gear 64 is inhibited by a pair of engagement projections 69 and 69 provided integrally with the first ring gear 64 and projecting radially outward engaging with restriction engagement holes 70 provided in the semicylindrical portion 20c and the cover member 21 respectively.

The first carrier 66 of the first reduction mechanism 37 includes a rotary shaft 71 that is coaxial with the rotational axis of the electric motor 34 and runs rotatably through the second dividing wall 47, and a second reduction mechanism 38 is disposed between the rotary shaft 71 and the drive shaft 31.

The second reduction mechanism 38 is a planetary gear mechanism having a second sun gear 72 fixed to the rotary shaft 71, a second ring gear 73 fixed to the housing part 22 so as to coaxially surround the second sun gear 72, second planetary gears 74 meshing with the second sun gear 72 and the second ring gear 73 at three positions spaced in the peripheral direction, and a second carrier 75 that has support shafts 76 rotatably supporting these second planetary gears 74 and that retains the second planetary gears 74, the second reduction mechanism 38 being housed in the second housing chamber 42.

The second sun gear 72 is fixed to a portion of the rotary shaft 71 that projects into the second housing chamber 42. Furthermore, the second ring gear 73 basically has an outer diameter that fits into the inner periphery of the housing part 22, and rotation of the second ring gear 73 is inhibited by a pair of engagement projections 77 provided integrally with the second ring gear 73 and projecting radially outward engaging with restriction engagement holes 78 provided respectively in the semicylindrical portion 20c and the cover member 21. An end part, on the second reduction mechanism 38 side, of the drive shaft 31 is relatively unrotatably connected to the second carrier 75 of the second reduction mechanism 38.

The operation of this embodiment is now explained; since the electric lock means 15, which can switch in response to operation of the electric motor 34 between a locked state in which pivoting of the steering shaft 14 is prevented and an unlocked state in which pivoting of the steering shaft 14 is permitted, is disposed within the column pipe 13, it is unnecessary for the electric lock means 15 to have a structure that can withstand breakage, it becomes impossible to break or unlock the electric lock means 15, and theft resistance can be enhanced.

Furthermore, since the electric lock means 15 is incorporated into the steering shaft 14 within the column pipe 13, theft resistance can be further enhanced.

Moreover, in the embodiment above, in the electric lock means 15 the first and second reduction mechanisms 37 and 38 for slowing down the output of the electric motor 34 are formed from a planetary gear mechanism in which input and output ends are coaxial, and outer shapes of the first and second reduction mechanisms 37 and 38 are substantially circular, and the electric lock means 15 can easily be built in the cylindrical housing part 22 of the steering shaft 14.

Although an embodiment of the present invention is explained above, the present invention is not limited to the above-mentioned embodiment and may be modified in a variety of ways as long as the modifications do not depart from the present invention described in Claims.

For example, as a reduction mechanism of the electric lock means 15, instead of the planetary gear mechanism of the above-mentioned embodiment, a hypocycloid mechanism or epitrochoid mechanism in which input and output ends are coaxial may be used.

The invention claimed is:

1. An electric steering lock device, comprising
a column pipe,
a steering shaft pivotably passed through the interior of the column pipe, and
an electric lock unit comprising a plurality of components including an electric motor and a drive shaft, said drive shaft having an axis parallel with an axis of the steering shaft; wherein said electric lock unit is operable to switch in response to operation of the electric motor between a locked state in which pivoting of the steering shaft is prevented, and an unlocked state in which pivoting of the steering shaft is permitted,
wherein said electric lock unit is provided integrally with the steering shaft;
wherein said steering shaft is rotatably supported on the column pipe via bearings; and said electric motor of the electric lock unit is mounted on said steering shaft inside said column pipe;
wherein said electric lock unit is entirely disposed within said column pipe, is fixed to said steering shaft, and rotates together with said steering shaft;
wherein said steering shaft comprises a pair of shaft portions which are rotatably supported on the column pipe via said bearings, and an intermediate portion arranged between the pair of shaft portions, said electric lock unit being mounted on said intermediate portion; and
wherein said drive shaft is operable to receive a drive force from the electric motor, said drive shaft having an eccentric cam provided thereon, and said eccentric cam being in abutment against a lock member which is capable of engaging with the column pipe in said locked state.

2. The electric steering lock device according to claim 1, wherein the eccentric cam is operatively connected with said electric motor and disposed in the steering shaft within the column pipe.

3. An electric steering lock device according to claim 1, wherein said electric motor is arranged inside the steering shaft such that axes of the electric motor and the column pipe are parallel to each other.

4. An electric steering lock device according to claim 1, wherein said electric motor is arranged coaxially with said column pipe and said steering shaft.

5. An electric steering lock device comprising
a column pipe configured to be attachable to a vehicle body frame;
a steering shaft coaxially disposed within said column pipe; and
an electric lock unit having several components which are arranged within said steering shaft;
wherein said electric lock unit comprises:
a lock plate operable to detachably engage with an engagement hole formed in the column pipe;
a return spring operable to urge the lock plate in an engagement direction thereof with the engagement hole;
a drive shaft having an eccentric cam operable to abut against the lock plate from a side opposite to a spring load direction of the return spring; and
an electric motor operatively attached to said drive shaft;

wherein said electric lock unit is provided integrally with the steering shaft; wherein said steering shaft is rotatably supported on the column pipe via bearings; and said electric motor of the electric lock unit is mounted on said steering shaft inside said column pipe;

wherein said electric lock unit is entirely disposed within said column pipe, is fixed to said steering shaft, and rotates together with said steering shaft;

wherein said steering shaft comprises a pair of shaft portions which are rotatably supported on the column pipe via said bearings, and an intermediate portion arranged between the pair of shaft portions, said electric lock unit being mounted on said intermediate portion; and wherein said drive shaft receives a drive force from the electric motor, said drive shaft having an axis parallel with an axis of the steering shaft, and the eccentric cam being in abutment against said lock plate which is capable of engaging with the hole formed in the column pipe in said locked state.

6. An electric steering lock device according to claim 5, wherein
said pair of shaft portions disposed coaxially; and
said intermediate portion comprises a cylindrical housing member disposed between said pair of shaft portions; and
wherein said electric lock unit is disposed in the cylindrical housing member.

7. An electric steering lock device according to claim 6, wherein said cylindrical housing member comprises a plurality of housing chambers; and wherein said electric motor is disposed in one of said housing chambers.

8. An electric steering lock device according to claim 5, wherein said electric motor comprises an output shaft arranged coaxially with the steering shaft.

9. An electric steering lock device according to claim 5, wherein said electric motor of the electric lock unit is arranged coaxially within said steering shaft.

* * * * *